US011579380B2

(12) United States Patent
Claver et al.

(10) Patent No.: US 11,579,380 B2
(45) Date of Patent: Feb. 14, 2023

(54) MECHANICAL CONNECTOR WITH CABLE RETENTION FEATURE

(71) Applicant: PPC BROADBAND, INC., East Syracuse, NY (US)

(72) Inventors: Nicholas V. Claver, Liverpool, NY (US); William Crawford, Syracuse, NY (US); Peter Carapella, Fayetteville, NY (US); Brian Honsinger, Baldwinsville, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 17/118,600

(22) Filed: Dec. 10, 2020

(65) Prior Publication Data

US 2021/0173156 A1 Jun. 10, 2021

Related U.S. Application Data

(60) Provisional application No. 62/945,966, filed on Dec. 10, 2019.

(51) Int. Cl.
*G02B 6/36* (2006.01)
*G02B 6/38* (2006.01)
*G02B 6/44* (2006.01)

(52) U.S. Cl.
CPC ......... *G02B 6/3894* (2013.01); *G02B 6/3887* (2013.01); *G02B 6/4471* (2013.01)

(58) Field of Classification Search
CPC .. G02B 6/3894; G02B 6/3887; G02B 6/4471; G02B 6/38875; G02B 6/3888; G02B 6/36
See application file for complete search history.

(56) References Cited

U.S. PATENT DOCUMENTS

| 6,179,480 | B1 | 1/2001 | Bella et al. | |
|---|---|---|---|---|
| 9,519,114 | B2 * | 12/2016 | Zimmel | G02B 6/4441 |
| 2008/0226234 | A1 | 9/2008 | Droege | |
| 2015/0071592 | A1 | 3/2015 | Zimmel | |
| 2015/0117822 | A1 | 4/2015 | Hu et al. | |
| 2018/0314013 | A1 * | 11/2018 | Kaplan | G02B 6/3887 |
| 2020/0049903 | A1 * | 2/2020 | Okada | G02B 6/4432 |

OTHER PUBLICATIONS

Search Report dated Feb. 19, 2021 in corresponding International Application No. PCT/US2020/064392, 3 pages.
Written Opinion dated Feb. 19, 2021 in corresponding International Application No. PCT/US2020/064392, 7 pages.

* cited by examiner

*Primary Examiner* — Jennifer Doan
(74) *Attorney, Agent, or Firm* — MH2 Technology Law Group LLP

(57) ABSTRACT

A connector includes a body and a cap configured to be threadedly coupled with the body. The body is configured to receive a fiber optic cable therein and to be coupled with a sub-assembly of a fiber optic connector, an inner surface of the body includes an annularly-extending ridge that protrudes radially inward, and the body is configured to be radially compressed on a jacket of the fiber optic cable when the cap is threadedly coupled with the body.

30 Claims, 10 Drawing Sheets

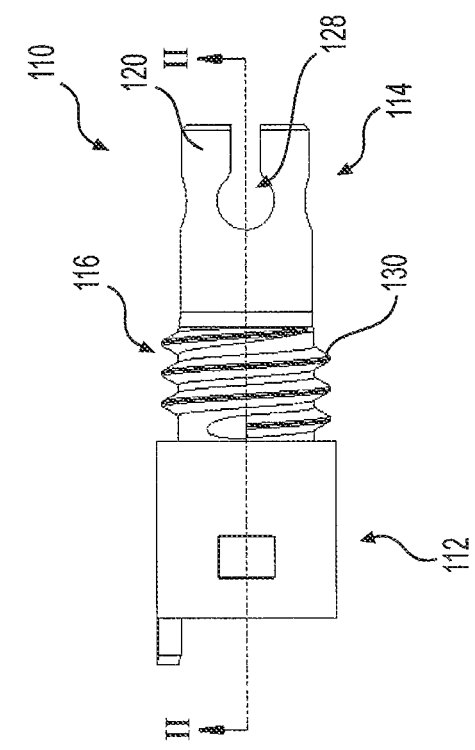
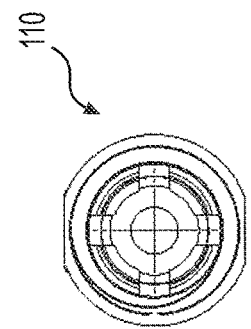
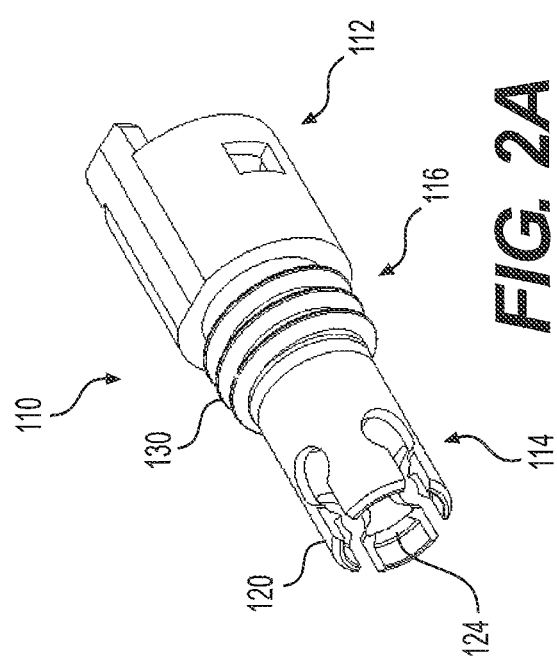
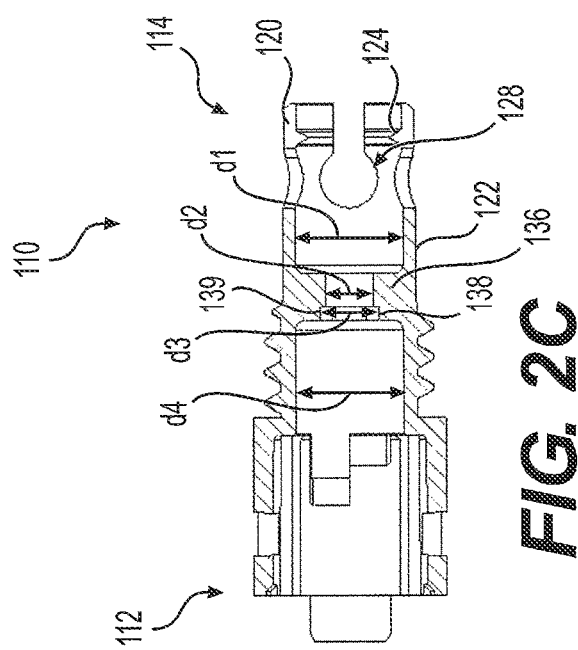

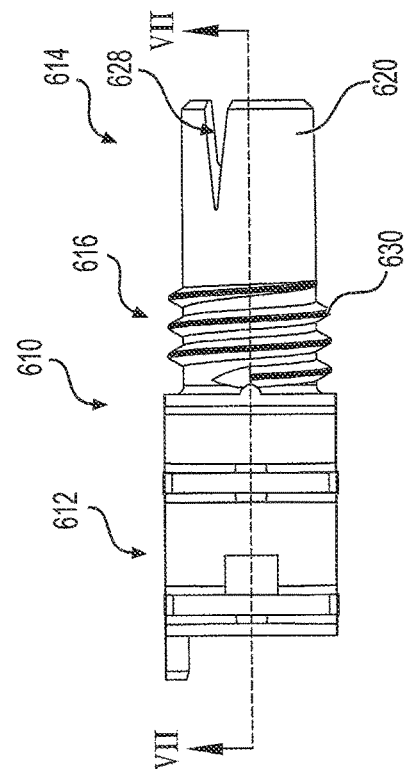
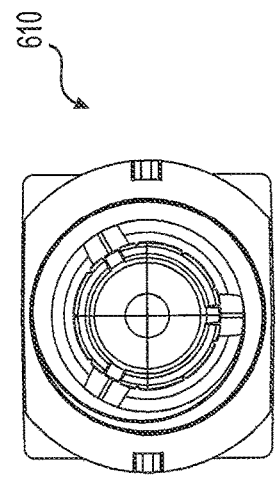
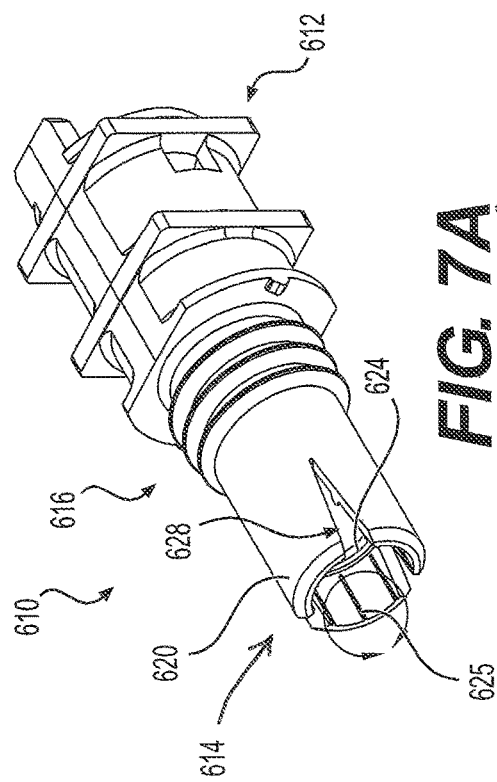
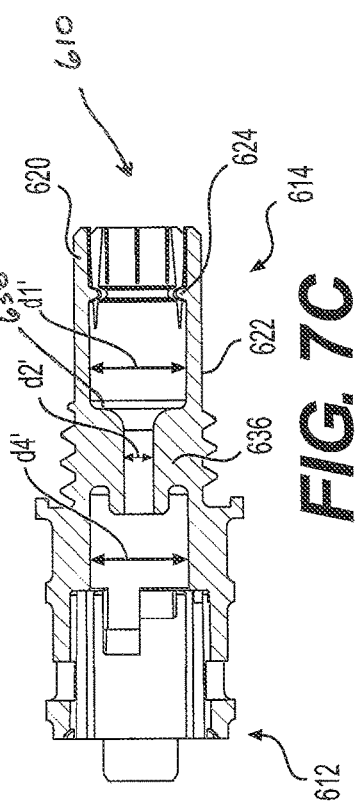
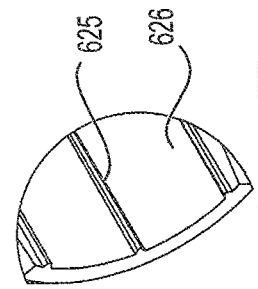

MECHANICAL CONNECTOR WITH CABLE RETENTION FEATURE

CROSS-REFERENCE TO RELATED APPLICATION

This application claims the benefit of U.S. Provisional Application No. 62/945,966, filed Dec. 10, 2019, the disclosure of which is hereby incorporated by reference herein in its entirety.

TECHNICAL FIELD

The present invention relates generally to connectors for coupling a fiber optic cable to a fiber optic connector. More particularly, the present invention relates to mechanical connectors that are configured to be secured to a fiber optic cable via compression and to be coupled with a fiber optic connector.

BACKGROUND

Fiber optical communication systems typically use a network of fiber optic cables to transmit large volumes of data. Typical fiber optic connectors include a ferrule that supports an end portion of an optical fiber. When two fiber optic connectors are interconnected, end faces of the ferrules, on each connector, directly oppose one another. Thus, the optical fibers, which are supported by each ferrule, are also directly opposed to each other. Furthermore, springs in each connector bias the optical fibers towards each other when the connectors are in this interconnected state. An optical signal can then be transmitted from one optical fiber to the other optical fiber.

Conventional fiber optical connectors are either fastened to a Kevlar strengthening member that is included in the fiber optic cable or crimped onto a crimp ring through the use of a crimp tool. Attaching the connector to the Kevlar strengthening member creates a relatively weak connection that is easy to bend. Further, some types of fiber optic cable, such as Miniflex® fiber cable, contains less Kevlar than other standard jumper cord, which could result in a less reliable connection under load.

Crimp-type fiber optic connectors are not convenient because they require every installer to carry a specialized tool for crimping the connector onto the cable. Also, use of a crimping tool can lead to a poor connection due to potential installer error.

It may be desirable to provide a connector that overcomes one or more of the aforementioned disadvantages of conventional fiber optics connectors. For example, it may be desirable to provide a connector configured to couple a fiber optic cable with a fiber optic connector with increased connection strength and where the risk of craft error is reduced.

SUMMARY

According to various aspects of the present disclosure, a connector includes a body including a threaded portion and a cap configured to be threadedly coupled with the threaded portion of the body. The body is configured to receive a fiber optic cable therein, an inner surface of the body includes an annularly-extending ridge that protrudes radially inward, the body is configured to be radially compressed on a jacket of the fiber optic cable when the cap is threadedly coupled with the body, and the annularly-extending ridge is configured to engage a circumferential groove in the fiber optic cable to prevent relative axial movement between the fiber optic able and the connector. The body includes a forward portion and a rearward portion, the threaded portion being between the forward and rearward portions and including threads on an external surface of the body, the forward portion being configured to be coupled with a fiber optic connector sub-assembly, the rearward portion of the body including a plurality of fingers that extend from a tubular wall of the rearward portion in a rearward direction away from the threaded and forward portions. The forward portion of the cap includes internal threads that are sized and arranged to be threadedly coupled with the threads on the external surface of the body, the rearward portion of the cap includes a tapered inside diameter portion that tapers radially inward in the rearward direction from the internal threads, and the tapered inside diameter portion is configured to engage and radially compress the plurality of fingers toward the outer jacket of the fiber optic cable when the cap is threadedly coupled with the body such that the fiber optic cable is gripped by the body.

In some aspects, the connector includes a crimp sleeve. A jacket of the fiber optic cable is received between the body and the crimp sleeve. The crimp sleeve includes an elongated tubular member terminating at a forward flanged head portion, and the flanged head portion includes a first flange portion rearward of a second flange portion, each of the first and second flange portions including an annular flange, with the second flange portion having a greater outer dimension that the first flange portion, the first flange portion including at least one flattened region on its outer surface. The tubular wall of the rearward portion of the body includes an annular notch configured to receive the first flange portion of the crimp sleeve, and the notch includes one or more flattened regions sized and arranged to receive the one or more flattened regions of the first flange portion of the crimp sleeve such that the crimp sleeve does not rotate relative to the body when the first flange portion is received by the notch.

According to various aspects of the present disclosure, a connector includes a body including a threaded portion. and a cap configured to be threadedly coupled with the threaded portion of the body. The body is configured to receive a fiber optic cable therein, an inner surface of the body includes an annularly-extending ridge that protrudes radially inward, the body is configured to be radially compressed on a jacket of the fiber optic cable when the cap is threadedly coupled with the body, the annularly-extending ridge is configured to engage a circumferential groove in the fiber optic cable to prevent relative axial movement between the fiber optic able and the connector, the rearward portion of the cap includes a tapered inside diameter portion that tapers radially inward in the rearward direction from the internal threads, and the tapered inside diameter portion is configured to engage and radially compress the plurality of fingers toward the outer jacket of the fiber optic cable when the cap is threadedly coupled with the body such that the fiber optic cable is gripped by the body.

In various aspects, the body includes a forward portion and a rearward portion, the threaded portion being between the forward and rearward portions and including threads on an external surface of the body, the forward portion being configured to be coupled with a fiber optic connector sub-assembly, the rearward portion of the body including a plurality of fingers that extend from a tubular wall of the rearward portion in a rearward direction away from the threaded and forward portions. The forward portion of the cap includes internal threads that are sized and arranged to be threadedly coupled with the threads on the external surface of the body.

In some aspects, the connector includes a crimp sleeve. A jacket of the fiber optic cable is received between the body and the crimp sleeve. The crimp sleeve includes an elongated tubular member terminating at a forward flanged head portion, and the flanged head portion includes a first flange portion rearward of a second flange portion, each of the first and second flange portions including an annular flange, with the second flange portion having a greater outer dimension that the first flange portion, the first flange portion including at least one flattened region on its outer surface. The tubular wall of the rearward portion of the body includes an annular notch configured to receive the first flange portion of the crimp sleeve, and the notch includes one or more flattened regions sized and arranged to receive the one or more flattened regions of the first flange portion of the crimp sleeve such that the crimp sleeve does not rotate relative to the body when the first flange portion is received by the notch.

According to various embodiments of the disclosure, a connector includes a body and a cap configured to be threadedly coupled with the body. The body is configured to receive a fiber optic cable therein and to be coupled with a sub-assembly of a fiber optic connector, an inner surface of the body includes an annularly-extending ridge that protrudes radially inward, and the body is configured to be radially compressed on a jacket of the fiber optic cable when the cap is threadedly coupled with the body.

BRIEF DESCRIPTION OF THE DRAWINGS

FIGS. 2A-2D are perspective, side, side cross-sectional (along line II-II), and end views, respectively, of the body of the exemplary connector of FIG. 1.

FIGS. 7A-7D are perspective, side, side cross-sectional (along line VII-VII), and end views, respectively, of the body of the exemplary connector of FIG. 6.

FIG. 7E is an enlarged perspective view of a portion of the body of the exemplary connector of FIG. 6.

DETAILED DESCRIPTION OF EMBODIMENTS

Figure 5:
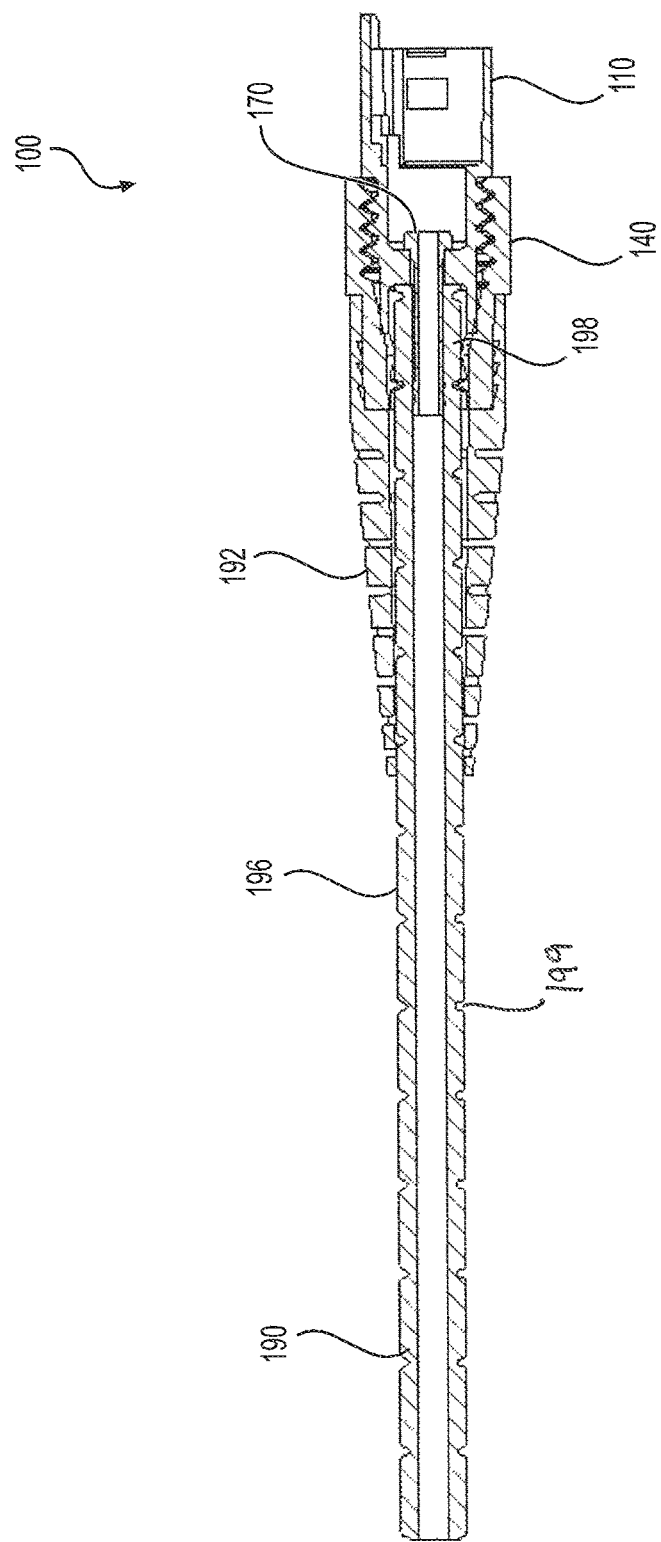
FIG. 5 is a side cross-sectional view of the exemplary connector of FIG. 1 assembled with a fiber optic cable.

FIGS. 1-5 illustrate an exemplary connector 100 in accordance with various aspects of the disclosure. The connector 100 is configured for use with a fiber optic cable 190, such as, for example, a Miniflex® fiber cable, as illustrated in FIG. 5. Of course, the connector 100 may be used with any fiber optic cable.

Figure 1:
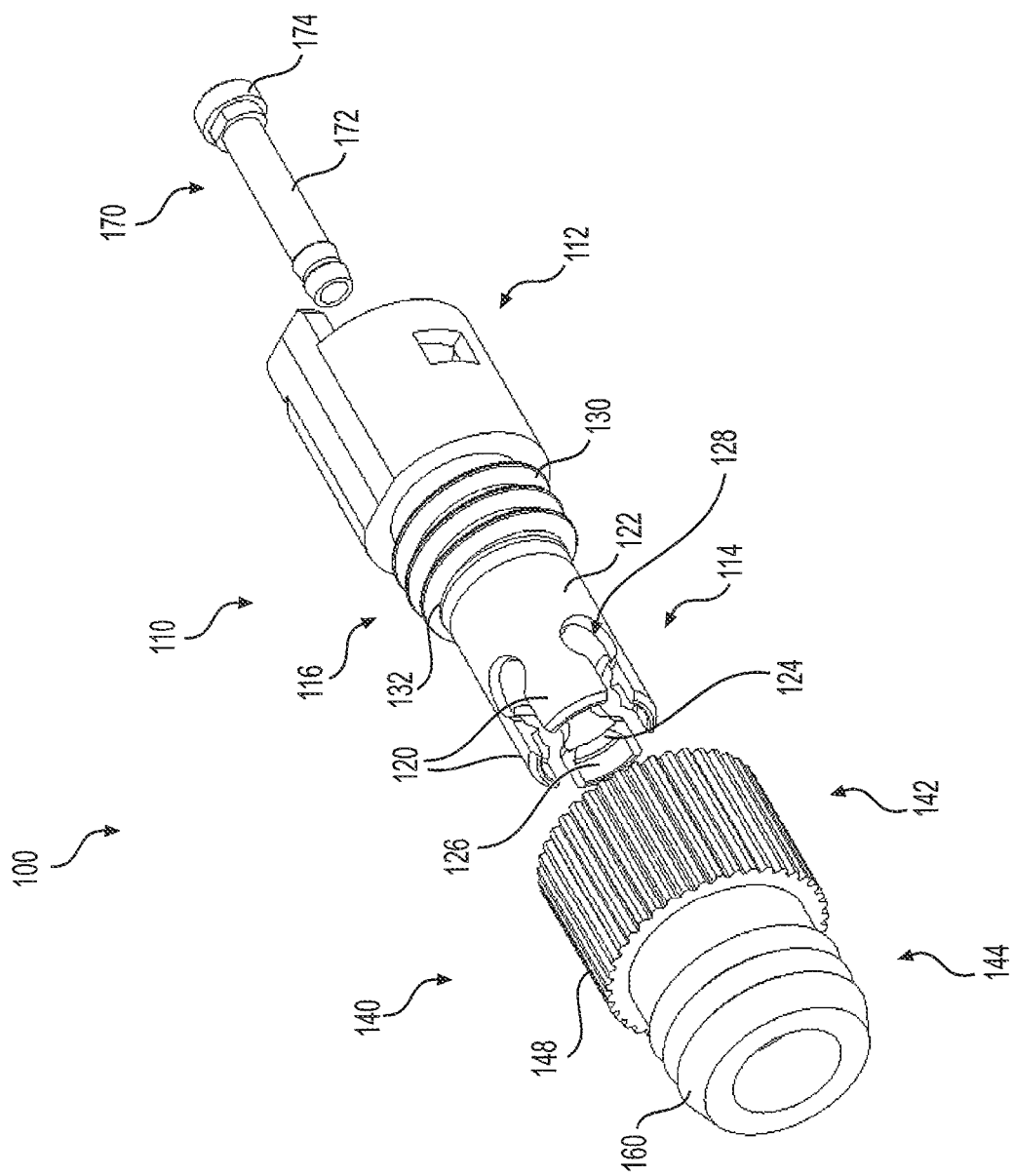
FIG. 1 is an exploded perspective view of an exemplary connector in accordance with various aspects of the disclosure.

Referring to FIG. 1, the connector 100 includes a body 110, a cap 140, and a crimp sleeve 170. The body 110 is configured to be coupled with a fiber optic connector sub-assembly, such as, for example, the fiber optic connector sub-assembly 682 illustrated in FIGS. 9 and 10. The fiber optic connector sub-assembly 682 may be a sub-assembly of a Subscriber Connector (SC connector), a Lucent Connector (LC connector), a Straight Tip Connector (ST connector), or the like.

Referring now to FIGS. 2A-2D, the body 110 includes a forward portion 112, a rearward portion 114, and a threaded portion 116 between the forward and rearward portions 112, 114. The forward portion 112 is configured to be coupled with the fiber optic connector subassembly, as described in more detail below. The threaded portion 116 includes threads 130 on an external surface 132. The rearward portion 114 includes a plurality of fingers 120 that extend from a tubular wall portion 122 of the rearward portion 114 in a rearward direction away from the threaded and forward portions 116, 112.

In the embodiment illustrated in FIGS. 1-5, the plurality of fingers 120 are defined by keyhole-shaped cutouts 128 at a rearward end of the rearward portion 114 of the body 110. Although the embodiment of FIGS. 1-5 includes a rearward portion 114 having four fingers 120, it should be understood that in some embodiments the rearward portion 114 may include two fingers or three fingers or more than four fingers. One or more of the plurality of fingers 120 may include an annularly-extending ridge 124 that protrudes radially inward from an inner surface 126 of the one or more fingers 120.

Referring now to FIGS. 3A-3D, the cap 140 includes a forward portion 142 and a rearward portion 144. The forward portion 142 includes internal threads 146 (FIG. 3C) and an exterior surface that may include one or more gripping features 148, for example, raised ribs, grooves, knurls, and/or the like. The rearward portion 144 may include an outer surface 158 having one or more barbs 160 configured to receive and to help retain a boot 192, as illustrated in and described with respect to FIG. 5. The internal threads 146 are sized and arranged to be threadedly coupled with the threads 130 on the external surface 132 of the body 110.

Referring to FIGS. 4A-4D, the crimp sleeve 170 includes an elongated tubular member 172 terminating at a forward flanged head portion 174. In the embodiment shown in FIGS. 4A-4C, the flanged head portion 174 includes a first flange portion 176 rearward of a second flange portion 178. Each of the first and second flange portions 176, 178 includes an annular flange, with the second flange portion 178 having a greater outer dimension in a radial direction than the first flange portion 176. Also, the first flange portion 176 includes at least one flattened region 180 on its outer surface. The illustrated embodiment includes two flattened regions 180 but may include one flatted region or more than two flattened regions in some embodiments.

Referring again to FIG. 2C, the tubular wall 122 of the rearward portion 114 of the body 110 includes a first inside diameter d1 adjacent the fingers 120. The body 110 includes a flange portion 136 that extends radially inward from an inner surface of the tubular wall 122 of the rearward portion 114 and the threaded portion 116. That is, the flange portion 136 extends axially from the rearward portion 114 into the threaded portion 116. The flange portion 136 has a second inside diameter d2 that is smaller than the first inside diameter d1. A forward end of the flange portion 136 includes a notched portion 138 sized and arranged to receive the first flange portion 176 of the crimp sleeve 170. That is, the notched portion 138 has a third inside diameter d3 that is larger than the second inside diameter d2, but smaller than the first inside diameter d1. The notched portion 138 includes one or more flattened regions 139 (the same number as the number of flattened regions 180 on the first flange portion 176 of the crimp sleeve 170) sized and arranged to receive the one or more flattened regions 180 of the first flange portion 176 of the crimp sleeve 170 such that the crimp sleeve 170 cannot rotate relative to the body 110 when the first flange portion 176 is received by the notched portion 138. The threaded portion 116 of the body 110 includes a fourth inside diameter d4 rearward of the inward flange 136 and the notched portion 138. The fourth inside diameter d4 is greater than the second and third inside diameters d2, d3 and may be the same as, larger than, or smaller than the first inside diameter d1.

Figure 3B:
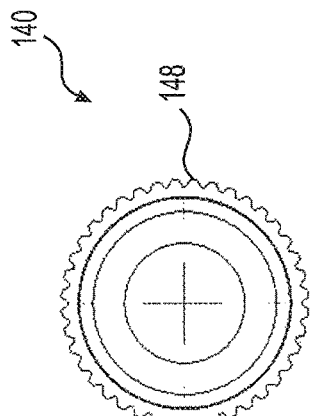
FIGS. 3A-3D are perspective, side, side cross-sectional (along line III-III), and end views, respectively, of the cap of the exemplary connector of FIG. 1.
Figure 3D:
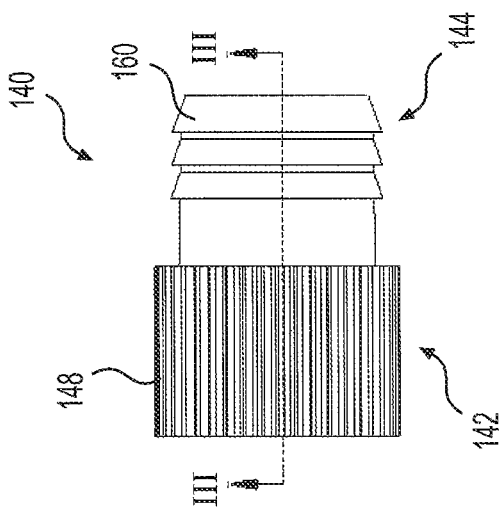
Figure 3A:
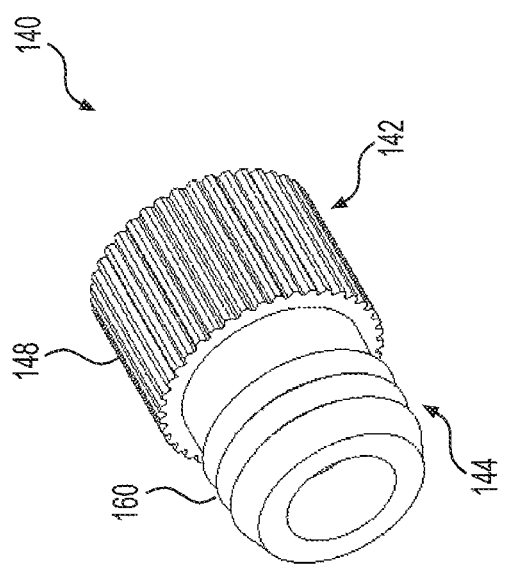
Figure 3C:
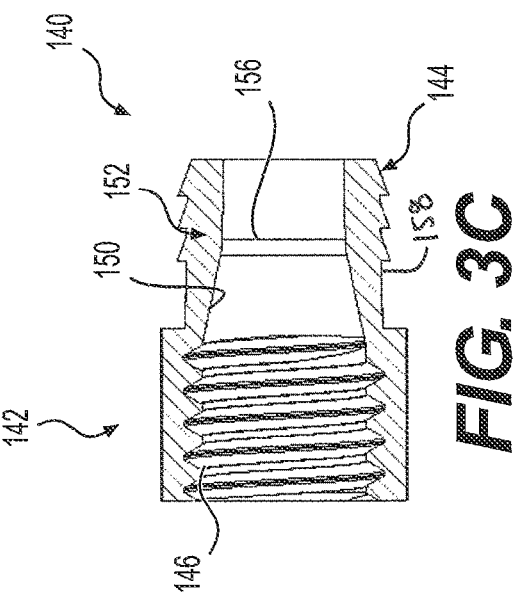
Figure 4B:
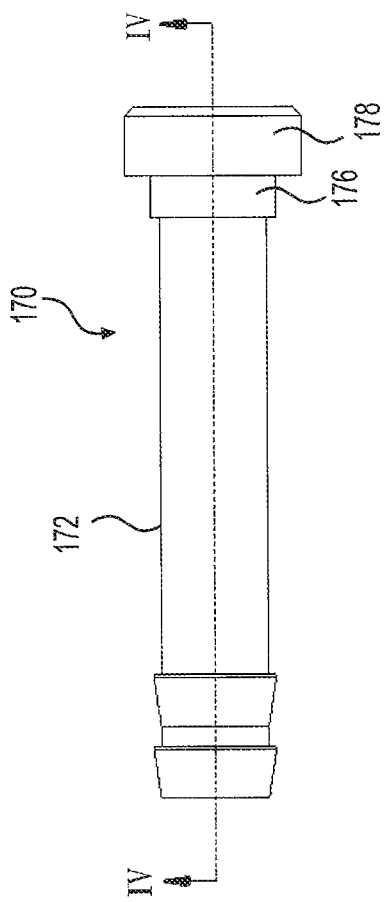
FIGS. 4A-4D are perspective, side, side cross-sectional (along line IV-IV), and end views, respectively, of the crimp sleeve of the exemplary connector of FIG. 1.
Figure 4D:
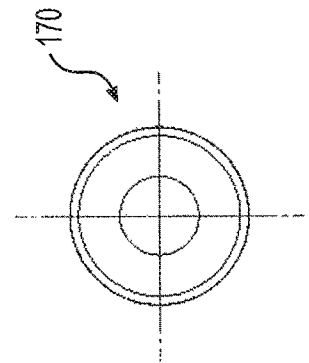
Figure 4A:
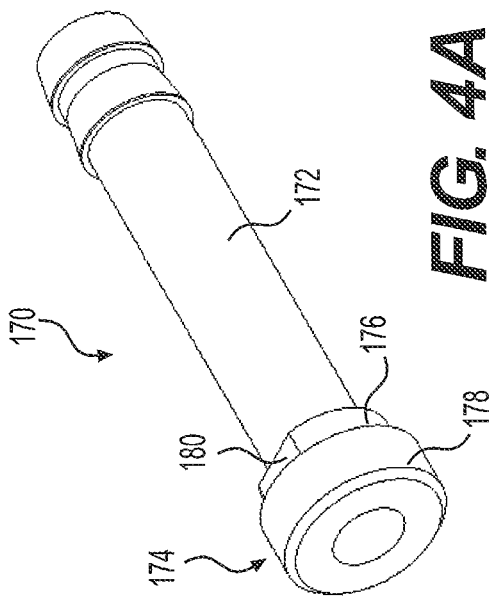
Figure 4C:
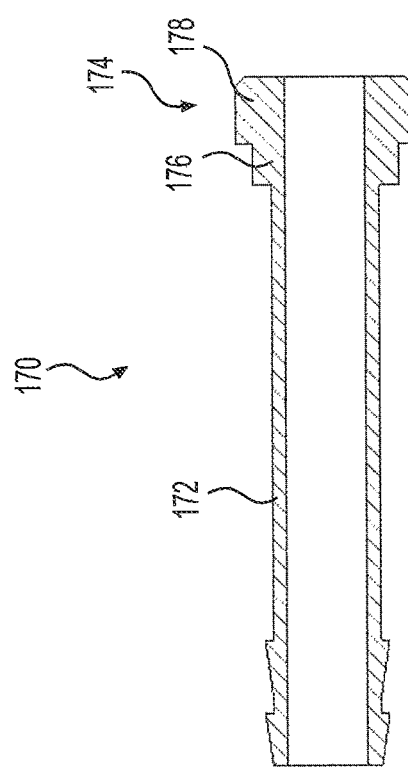

Referring now to FIG. 3C, the rearward portion 144 of the cap 140 includes a tapered inside diameter portion 150 that tapers radially inward in the rearward direction from the internal threads 146 to a middle region 152 of the rearward portion 144. The inside diameter of the cap from the middle region 152 to the rearward end 154 of the rearward portion remains substantially constant, allowing for manufacturing tolerances that may lead to a small taper of, for example, about 1°. The middle region 152 may include a rounded transition 156 between the tapered inside diameter portion 150 and the substantially constant diameter portion. As illustrated, the inner diameter of the portion of the cap 140 extending from the middle region 152 to the rearward end 154 of the rearward portion 144 is less than an outer diameter of the fingers 120, such that the cap 140 is configured to compress the fingers 120 radially inward when the cap 140 is threadedly coupled with the body 110.

In use, the elongated tubular member 172 of the crimp sleeve 170 is inserted into the forward portion 112 of the body 110 until the first flange portion 176 is received by the notch 138 of the inward flange 136 of the body 110. The one or more flattened regions 180 of the first flange portion 176 of the crimp sleeve 170 are aligned with and received by the one or more flattened regions 139 of the inward flange 139 such that the crimp sleeve 170 cannot rotate relative to the body 110. As shown in FIG. 5, the elongated tubular member 172 extends through the inward flange 136 and through the threaded and rearward portions 116, 114 of the body 110. In some aspects, the tubular member 172 may extend axially outward from the rearward portion 114 of the body 110.

In order to attach the connector 100 with a fiber optic cable 190, the boot 192 is slipped over an outer jacket 196 and an optical fiber 194 at an end 198 of the fiber optic cable 190 and moved over the fiber optic cable 190 in a direction away from the end 198. Next, the cap 140 is slipped over the outer jacket 196 and the optical fiber 194 at the end 198 of the fiber optic cable 190 with the rearward portion 144 of the cap 140 nearer to the boot 192, and the cap 140 is moved over the fiber optic cable 190 in the direction away from the end 198. Then, an optical fiber 194 (not shown in FIG. 5) and the jacket 196 of the fiber optic cable 190 are fed into the rearward portion 114 of the body 110 and through the crimp sleeve 170 from the rear direction to the forward direction. The optical fiber 194 is fed out the forward portion 112 of the body 110 so that the fiber 194 can be terminated with the fiber optic sub-assembly 182.

The end 198 of the outer jacket 196 of the fiber optic cable 190 is inserted into the rearward portion 114 of the body 110 to an axial position such that the axial groove 199' of the outer jacket 196 of the fiber optic cable 190 that is nearest the end 198 is aligned with the one or more ridges 124 of the fingers 120 of the body 110. It should be understood that the one or more ridges 124 may be spaced from the rearward end of the flange portion 136 by a distance that is substantially the same as a distance between successive grooves 199 in the outer jacket 196 such that the end 198 can be defined by a groove 199 and the one or more ridges 124 are aligned with the axial groove 199' nearest the end 198.

It should also be understood that the rearward portion 114 of the body 110 may have a length sized such that the inner surface of the rearward portion 114 may have a second annular ridge (not shown) extending radially inward and spaced from the one or more ridges 124 such that the second annular ridge and the one or more ridges 124 may engage two successive grooves 199 in the outer jacket 196 of the cable 190.

Next, the cap 140 is moved along the fiber optic cable 190 in the forward direction toward the body 110 until the internal threads 146 of the cap 140 begin to engage the external threads 130 of the body 110. The cap 140 is then rotated relative to the body 110. As the cap 140 is the rotated relative to the body 110 to threadedly couple the cap 140 with the body 110. As the cap 140 is rotated relative to the body 610, the tapered inside diameter portion 150 of the 140 cap engages and radially compresses the fingers 120 of the body 110 onto the outer jacket 196 adjacent the end 198 of the fiber optic cable 190. The one or more ridges 124 of the fingers 120 are configured to be received by the circumferential groove 199' in the cable 190, as shown in FIG. 5, to prevent relative axial movement between the fiber optic cable 190 and the connector 100, for example, under a load condition.

If the fiber optic cable 190 is not a grooved cable or if the annularly-extending ridges 124 on the fingers 120 do not align with a groove 199, the annularly-extending ridges 124 can still dig into the outer jacket 196 to help retain the fiber optic cable 190 in the connector 100 under a load condition. The cap 140 is rotated relative to the body 110 until the cap 140 and body 110 are tightened to one another by the threaded connection. After the cap 140 and the body 110 are tightened to one another, the boot 192 is moved along the cable 190 in the forward direction over the rearward portion 144 of the cap 140 and into engagement with the one or more barbs 160 on the outer surface of the cap 140 such that the boot 192 is retained by the cap 140.

Figure 9:
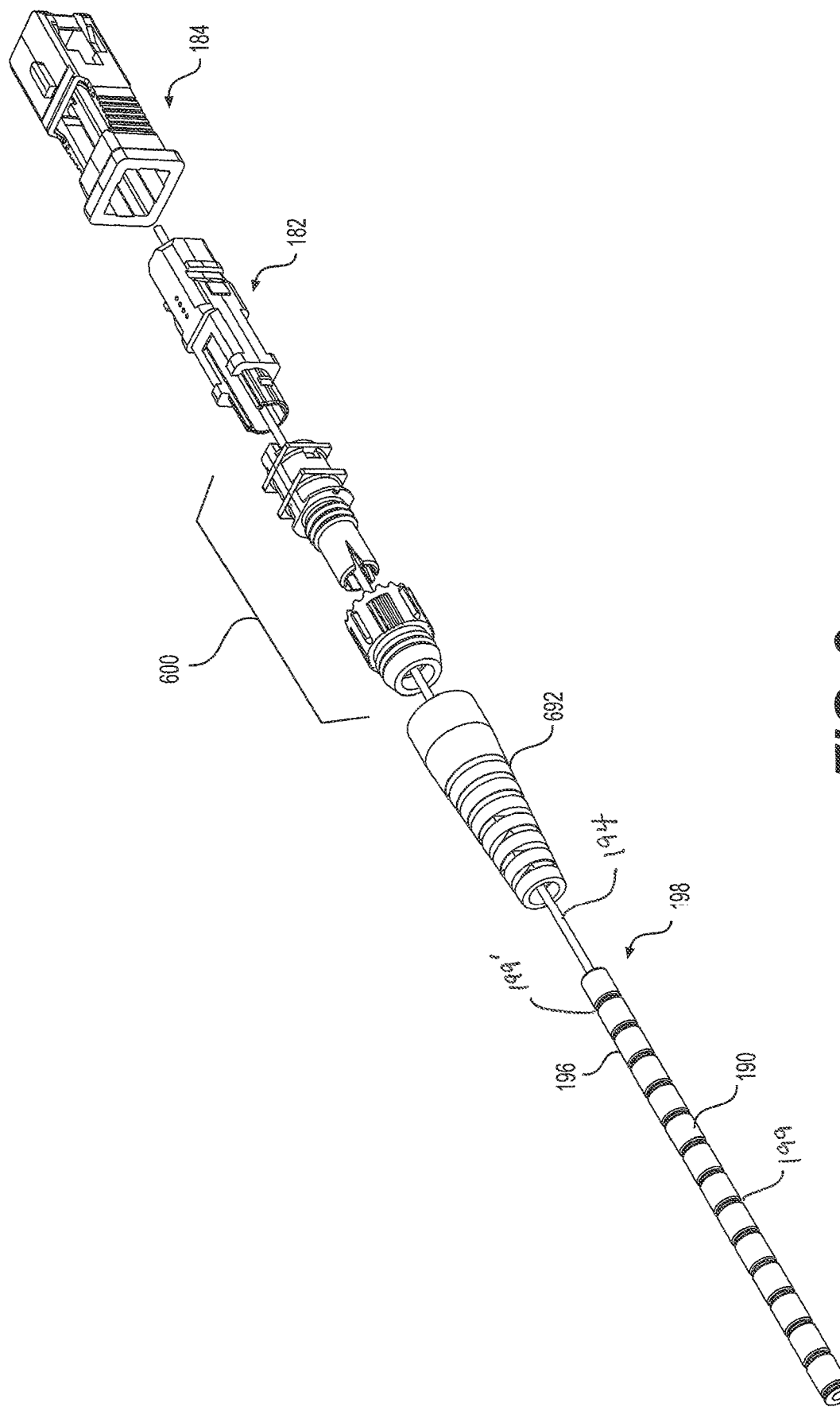
FIG. 9 is an exploded perspective view of the exemplary connector of FIG. 6 assembled with a fiber optic cable and a fiber optic connector.
Figure 10:
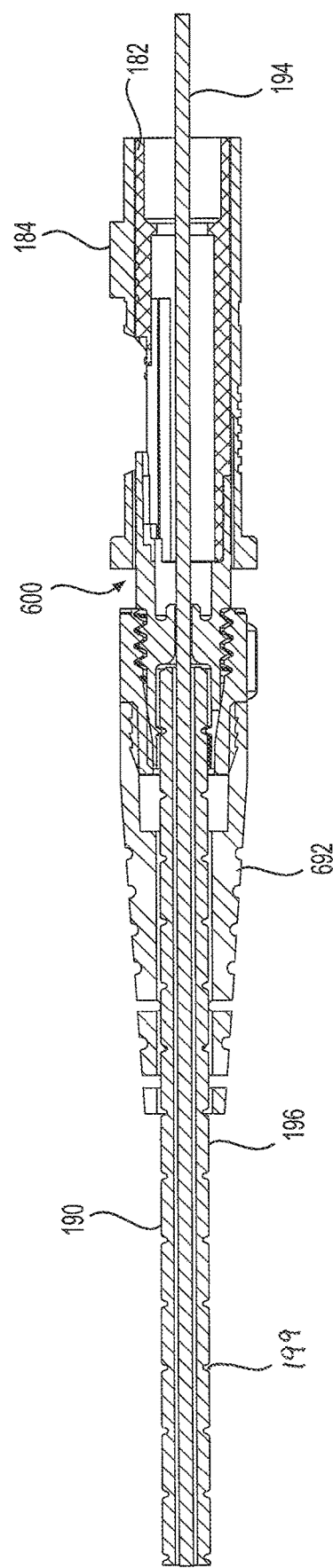
FIG. 10 is a side cross-sectional view of the exemplary connector of FIG. 6 assembled with a fiber optic cable and a fiber optic connector.

The optical fiber 194 that is fed out the forward portion 612 of the body 610 is cut and terminated with the fiber optic connector sub-assembly 182 (FIGS. 9 and 10) as would be understood by persons skilled in the art. Such cutting and termination may occur in the field, thus resulting in a field-terminated fiber optic connector. The fiber optic connector sub-assembly 182 is coupled with an outer housing 184 (FIGS. 9 and 10) that is configured to be coupled with a fiber optic port of, for example, a bulkhead adapter, a splitter, or the like. The outer housing 184 may be configured as an SC connector, an LC connector, an ST connector, or the like. For example, the housing may be configured as a Belden® SC connector, LC connector, ST connector, or the like FIGS. 6-10 illustrate another exemplary connector 600 in accordance with various aspects of the disclosure. The connector 600 is configured for use with a fiber optic cable 190, such as, for example, a Miniflex® fiber cable, as illustrated in FIGS. 9 and 10. Of course, the connector 600 may be used with any fiber optic cable.

Figure 6:
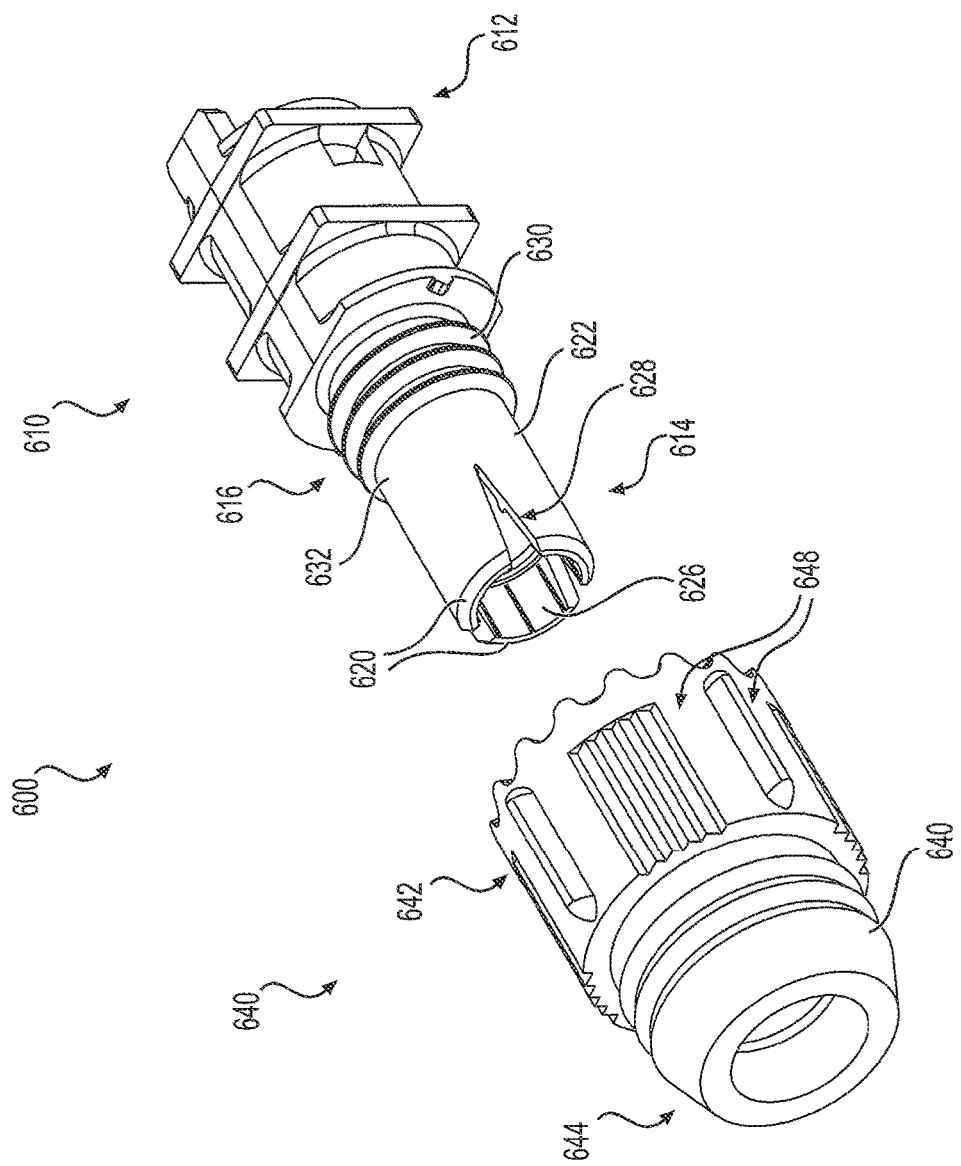
FIG. 6 is an exploded perspective view of another exemplary connector in accordance with various aspects of the disclosure.

Referring to FIG. 6, the connector 600 includes a body 610 and a cap 640. The body 610 is configured to be coupled with a fiber optic connector sub-assembly 682, as described in more detail below with reference to FIGS. 9 and 10. The fiber optic connector sub-assembly 682 may be a sub-assembly of an SC connector, an LC connector, an ST connector, or the like.

Referring now to FIGS. 7A-7D, the body 610 includes a forward portion 612, a rearward portion 614, and a threaded portion 616 between the forward and rearward portions 612, 614. The forward portion 612 is configured to be coupled with the fiber optic connector sub-assembly 682, as described in more detail below. The threaded portion 616 includes threads 630 on an external surface 632. The rearward portion 614 includes a plurality of fingers 620 that extend from a tubular wall 622 of the rearward portion 614 in a rearward direction away from the threaded and forward portions 616, 612.

In the embodiment illustrated in FIGS. 6-10, the plurality of fingers 620 are defined by V-shaped cutouts 628 at a rearward end of the rearward portion 614 of the body 610. Although the embodiment of FIGS. 6-10 includes a rearward portion 614 having three fingers 620, it should be understood that in some embodiments the rearward portion 614 may include two fingers or more than three fingers. One or more of the fingers 620 may include an annularly-extending ridge 624 that protrudes radially inward from an inner surface 626 of the one or more fingers 620. As shown in FIG. 7E, one or more of the plurality of fingers 620 may include axial ribs 625 extending radially inward from the inner surface 626. In some embodiments, the ribs 625 may be arranged in a non-axial direction, for example, in a helical configuration.

Referring now to FIGS. 8A-8D, the cap 640 includes a forward portion 642 and a rearward portion 644. The forward portion 642 includes internal threads 646 (FIG. 8C) and an exterior surface that may include one or more gripping features 648, for example, raised ribs, grooves, knurls, and/or the like. The rearward portion 644 may include an outer surface 658 having one or more barbs 660 configured to receive and to help retain a boot 692, as shown in FIGS. 9 and 10 below. The internal threads 646 are sized and arranged to be threadedly coupled with the threads 630 on the external surface 632 of the body 610.

Referring again to FIG. 7C, the tubular wall 622 of the rearward portion 614 of the body 610 includes a first inside diameter d1' adjacent the fingers 620. The body 610 includes a flange portion 636 that extends radially inward from an inner surface of the tubular wall 622 of the rearward portion 614 and the threaded portion 616. That is, the flange portion 636 extends axially from the rearward portion 614 into the threaded portion 616. The flange portion 636 has a second inside diameter d2' that is smaller than the first inside diameter d1'. A rearward end of the flange portion 636 defines a stop portion 638 configured to prevent the jacket 196 of the fiber optic cable 190 from moving through the flanged portion 636 of the body 610 in a rear to forward direction. The threaded portion 616 of the body 610 includes a fourth inside diameter d4' rearward of the inward flange 636. The fourth inside diameter d4' is greater than the second inside diameter d2' and may be the same as, larger than, or smaller than the first inside diameter d1'.

Figure 8B:
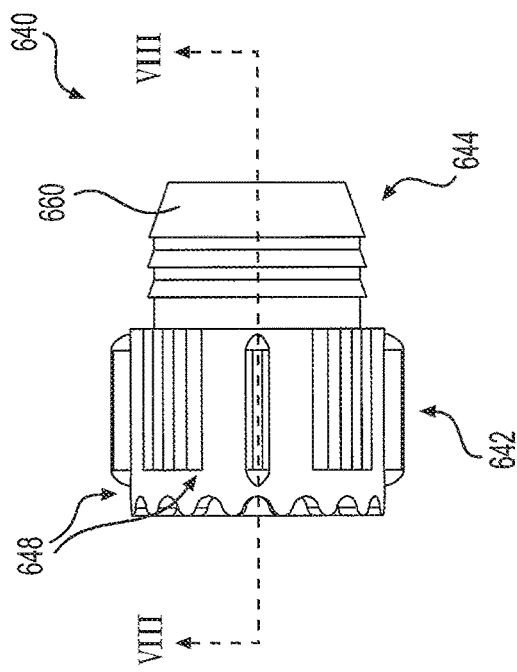
FIGS. 8A-8D are perspective, side, side cross-sectional (along line VIII-VIII), and end views, respectively, of the cap of the exemplary connector of FIG. 6.
Figure 8D:
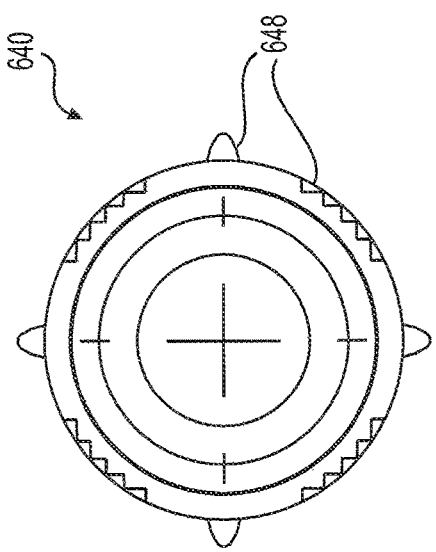
Figure 8A:
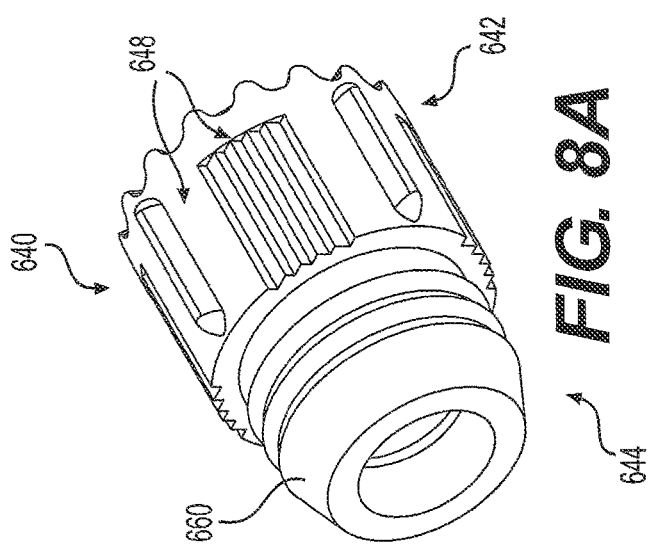
Figure 8C:
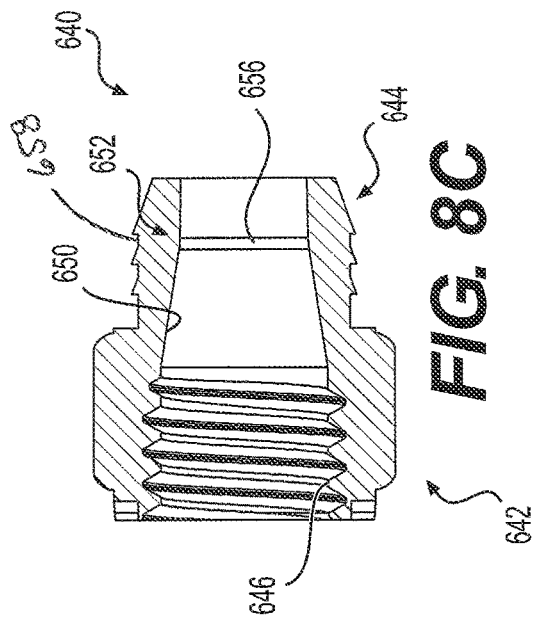

Referring now to FIG. 8C, the rearward portion 644 of the cap 640 includes a tapered inside diameter portion 650 that tapers radially inward in the rearward direction from the internal threads 646 to a middle region 652 of the rearward portion 644. The inside diameter of the cap from the middle region 652 to the rearward end 654 of the rearward portion remains substantially constant, allowing for manufacturing tolerances that may lead to a small taper of, for example, about 1°. The middle region 652 may include a rounded transition 656 between the tapered inside diameter portion 650 and the substantially constant diameter portion. As illustrated, the inner diameter of the portion of the cap 640 extending from the middle region 652 to the rearward end 654 of the rearward portion 644 is less than an outer diameter of the fingers 620, such that the cap 640 is configured to compress the fingers 620 radially inward when the cap 640 is threadedly coupled with the body 610.

In use, in order to attach the connector 600 with the fiber optic cable 190, the boot 692 is slipped over the outer jacket 196 and the optical fiber 194 at the end 198 of the fiber optic cable 190 and moved over the fiber optic cable 190 in a direction away from the end 198. Next, the cap 640 is slipped over the outer jacket 196 and the optical fiber 194 at the end 198 of the fiber optic cable 190 with the rearward portion 644 of the cap 640 nearer to the boot 692, and the cap 640 is moved over the fiber optic cable 190 in the direction away from the end 198. Then, the optical fiber 194 and the jacket 196 of the fiber optic cable 190 are fed into the rearward portion 614 of the body 610. The optical fiber 194 is fed out the forward portion 612 of the body 610 so that the fiber 194 can be terminated with the fiber optic connector sub-assembly 182.

The end 198 of the outer jacket 196 of fiber optic cable 190 is inserted into the rearward portion 614 of the body 610 to an axial position such that an axial groove 199' of outer jacket 196 of the fiber optic cable 190 that is nearest the end 198 is aligned with the one or more ridges 624 of the fingers 620 of the body 610. It should be understood that the one or more ridges 624 may be spaced from the stop portion 638 by a distance that is substantially the same as a distance between successive grooves 199 in the outer jacket 196 such that the end 198 can be defined by a groove 199 and the one or more ridges 624 are aligned with the axial groove 199' nearest the end 198.

It should also be understood that the rearward portion 614 of the body 610 may have a length sized such that the inner surface of the rearward portion 614 may have a second annular ridge (not shown) extending radially inward and spaced from the one or more ridges 624 such that the second annular ridge and the one or more ridges 624 may engage two successive grooves 199 in the outer jacket 196 of the cable 190.

Next, the cap 640 is moved along the fiber optic cable 190 in the forward direction toward the body 610 until the internal threads 646 of the cap 640 begin to engage the external threads 630 of the body 610. The cap 640 is then rotated relative to the body 610 to threadedly couple the cap 640 with the body 610. As the cap 640 is rotated relative to the body 610, the tapered inside diameter portion 650 of the cap 640 engages and radially compresses the fingers 620 of the body 610 onto the outer jacket 196 adjacent the end 198 of the fiber optic cable 190. The one or more ridges 624 of the fingers 620 are configured to be received by the circumferential groove 199' in the cable 190, as shown in FIGS. 9 and 10, to prevent relative axial movement between the fiber optic cable 190 and the connector 600, for example, under a load condition.

If the fiber optic cable 190 is not a grooved cable or if the annularly-extending ridges 624 on the fingers 620 do not align with a groove 199, the annularly-extending ridges 624 can still dig into the outer jacket 196 to help retain the fiber optic cable 190 in the connector 600 under a load condition. The cap 640 is rotated relative to the body 610 until the cap 640 and body 610 are tightened to one another by the threaded connection. After the cap 640 and the body 610 are tightened to one another, the boot 692 is moved along the cable 190 in the forward direction over the rearward portion 644 of the cap 640 and into engagement with the one or more barbs 660 on the outer surface of the cap 640 such that the boot 692 is retained by the cap 640.

The optical fiber 194 that is fed out the forward portion 612 of the body 610 is cut and terminated with the fiber optic connector sub-assembly 182 as would be understood by persons skilled in the art. Such cutting and termination may occur in the field, thus resulting in a field-terminated fiber optic connector. The fiber optic connector sub-assembly 182 is coupled with an outer housing 184 that is configured to be coupled with a fiber optic port of, for example, a bulkhead adapter, a splitter, or the like. The outer housing 184 may be configured as an SC connector, an LC connector, an ST connector, or the like. For example, the housing may be configured as a Belden® SC connector, LC connector, ST connector, or the like.

It should be appreciated that the fiber optic connector sub-assembly 182 may be coupled with an end of the forward portion 112, 612 of the body 110, 610 of the connector 100, 600 by any known or conventional means. For example, as shown in FIG. 9, the forward end 112, 612 may include a forward-extending flange configured to be received between a pair of flange walls of the sub-assembly 182. The forward-extending flange may include a forward end having an enlarged transverse dimension such that a notch of the forward-extending flange received the flange walls of the sub-assembly 182 to prevent relative axial movement between the body 112, 612 and the sub-assembly 182. The body 112, 612 may also include one or more openings in the forward portion configured to receive corresponding projections extending outward from the sub-assembly. The forward portion 112, 612 may also include structures that prevent relative rotation between the body 110, 610 and the outer housing 184.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A fiber optic connector configured to be mechanically coupled with a fiber optic cable without a crimping tool comprising:
    a body including a threaded portion;
    a sleeve configured to be insertingly and non-rotatingly received by the body;
    a cap configured to be threadedly coupled with the threaded portion of the body;
    wherein the body and the sleeve are configured to receive the fiber optic cable there between;
    wherein an inner surface of the body includes an annularly-extending ridge configured to engage a circumferential groove in the fiber optic cable to prevent relative axial movement between the fiber optic cable and the connector;
    wherein the body includes a forward portion and a rearward portion, and the threaded portion is between the forward and rearward portions;
    wherein the rearward portion of the body includes a plurality of fingers that extend from a tubular wall of the rearward portion in a rearward direction away from the threaded and forward portions;
    wherein a forward portion of the cap includes internal threads that are sized and arranged to be threadedly coupled with the threaded portion of the body, and a rearward portion of the cap includes an outer surface having a barb configured to receive a boot;
    wherein the rearward portion of the cap includes a tapered inside diameter portion that tapers radially inward in the rearward direction from the internal threads; and
    wherein the tapered inside diameter portion is configured to engage and radially compress the plurality of fingers onto the outer jacket of the fiber optic cable to clamp the outer jacket between the body and the sleeve when the cap is threadedly coupled with the body such that the body is mechanically coupled with the fiber optic cable without a crimping tool.

2. The fiber optic connector of claim 1,
    wherein the sleeve includes an elongated tubular member terminating at a forward flanged head portion, and the flanged head portion includes a first flange portion rearward of a second flange portion, each of the first and second flange portions including an annular flange, with the second flange portion having a greater outer dimension that the first flange portion, the first flange portion including at least one flattened region on its outer surface; and
    wherein the tubular wall of the rearward portion of the body includes an annular notch configured to receive the first flange portion of the sleeve, and the notch includes one or more flattened regions sized and arranged to receive the one or more flattened regions of the first flange portion of the sleeve such that the sleeve does not rotate relative to the body when the first flange portion is received by the notch.

3. The fiber optic connector of claim 1, wherein the body is configured to be coupled with a sub-assembly of a fiber optic connector.

4. The fiber optic connector of claim 3, wherein the sub-assembly is configured to be coupled with a fiber optic connector housing.

5. The fiber optic connector of claim 4, wherein the fiber optic connector housing comprises an SC connector, an LC connector, or an ST connector.

6. A fiber optic connector assembly comprising:
    a fiber optic cable having a circumferential groove;
    the fiber optic connector of claim 1 configured to be coupled with the fiber optic cable; and
    wherein the annularly-extending ridge is configured to engage the circumferential groove in the fiber optic cable to prevent relative axial movement between the fiber optic cable and the connector.

7. A fiber optic connector configured to be mechanically coupled with a fiber optic cable without a crimping tool comprising:
    a body including a threaded portion;
    a sleeve configured to be insertingly and non-rotatingly received by the body;

a cap configured to be threadedly coupled with the threaded portion of the body;
wherein the body and the sleeve are configured to receive the fiber optic cable there between;
wherein an inner surface of the body includes an annularly-extending ridge configured to engage a circumferential groove in the fiber optic cable to prevent relative axial movement between the fiber optic cable and the connector; and
wherein the cap is configured to engage and radially compress a portion of the body onto the outer jacket of the fiber optic cable to clamp the outer jacket between the body and the sleeve when the cap is threadedly coupled with the body such that the body is mechanically coupled with the fiber optic cable without a crimping tool.

8. The fiber optic connector of claim 7,
wherein the body includes a forward portion and a rearward portion, and the threaded portion is between the forward and rearward portions;
wherein the rearward portion of the body is configured to include a plurality of fingers that extend from a tubular wall of the rearward portion in a rearward direction away from the threaded and forward portions; and
wherein a forward portion of the cap includes internal threads that are sized and arranged to be threadedly coupled with the threaded portion of the body.

9. The fiber optic connector of claim 7,
wherein the sleeve includes an elongated tubular member terminating at a forward flanged head portion, and the flanged head portion includes a first flange portion rearward of a second flange portion, each of the first and second flange portions including an annular flange, with the second flange portion having a greater outer dimension that the first flange portion, the first flange portion including at least one flattened region on its outer surface; and
wherein the tubular wall of the rearward portion of the body includes an annular notch configured to receive the first flange portion of the sleeve, and the notch includes one or more flattened regions sized and arranged to receive the one or more flattened regions of the first flange portion of the sleeve such that the sleeve does not rotate relative to the body when the first flange portion is received by the notch.

10. The fiber optic connector of claim 7, wherein a rearward portion of the cap includes an outer surface having a barb configured to receive a boot.

11. The fiber optic connector of claim 7, wherein the body is configured to be coupled with a sub-assembly of a fiber optic connector.

12. The fiber optic connector of claim 11, wherein the sub-assembly is configured to be coupled with a fiber optic connector housing.

13. The fiber optic connector of claim 12, wherein the fiber optic connector housing comprises an SC connector, an LC connector, or an ST connector.

14. A fiber optic connector assembly comprising:
a fiber optic cable having a circumferential groove;
the fiber optic connector of claim 7 configured to be coupled with the fiber optic cable; and
wherein the annularly-extending ridge is configured to engage the circumferential groove in the fiber optic cable to prevent relative axial movement between the fiber optic cable and the connector.

15. A fiber optic connector configured to be mechanically coupled with a fiber optic cable without a crimping tool comprising:
a body;
a sleeve configured to be insertingly received by the body;
a cap configured to be threadedly coupled with the body;
wherein the body and the sleeve are configured to receive the fiber optic cable there between; and
wherein the cap is configured to engage and radially compress a portion of the body onto the outer jacket of the fiber optic cable to clamp the outer jacket between the body and the sleeve when the cap is threadedly coupled with the body such that the body is mechanically coupled with the fiber optic cable without a crimping tool.

16. The fiber optic connector of claim 15,
wherein the body includes a forward portion and a rearward portion, and the threaded portion is between the forward and rearward portions;
wherein the rearward portion of the body is configured to include a plurality of fingers that extend from a tubular wall of the rearward portion in a rearward direction away from the threaded and forward portions; and
wherein a forward portion of the cap includes internal threads that are sized and arranged to be threadedly coupled with the threaded portion of the body.

17. The fiber optic connector of claim 15,
wherein the sleeve includes an elongated tubular member terminating at a forward flanged head portion, and the flanged head portion includes a first flange portion rearward of a second flange portion, each of the first and second flange portions including an annular flange, with the second flange portion having a greater outer dimension that the first flange portion, the first flange portion including at least one flattened region on its outer surface; and
wherein the tubular wall of the rearward portion of the body includes an annular notch configured to receive the first flange portion of the sleeve, and the notch includes one or more flattened regions sized and arranged to receive the one or more flattened regions of the first flange portion of the sleeve such that the sleeve does not rotate relative to the body when the first flange portion is received by the notch.

18. The fiber optic connector of claim 15, wherein a rearward portion of the cap includes an outer surface having a barb configured to receive a boot.

19. The fiber optic connector of claim 15, wherein the body is configured to be coupled with a sub-assembly of a fiber optic connector.

20. The fiber optic connector of claim 19, wherein the sub-assembly is configured to be coupled with a fiber optic connector housing.

21. The fiber optic connector of claim 20, wherein the fiber optic connector housing comprises an SC connector, an LC connector, or an ST connector.

22. A fiber optic connector assembly comprising:
a fiber optic cable having a circumferential groove;
the fiber optic connector of claim 15 configured to be coupled with the fiber optic cable;
wherein an inner surface of the body includes an annularly-extending ridge that protrudes radially inward; and
wherein the annularly-extending ridge is configured to engage the circumferential groove in the fiber optic cable to prevent relative axial movement between the fiber optic cable and the connector.

23. A fiber optic connector configured to be mechanically coupled with a fiber optic cable without a crimping tool comprising:
- a body;
- a cap configured to be threadedly coupled with the body;
- wherein a rearward portion of the cap includes an outer surface having a barb configured to receive a boot;
- wherein the body is configured to receive the fiber optic cable therein; and
- wherein the cap is configured to engage and radially compress a portion of the body onto the outer jacket of the fiber optic cable when the cap is threadedly coupled with the body such that the body is mechanically coupled with the fiber optic cable without a crimping tool.

24. The fiber optic connector of claim 23,
- wherein the body includes a forward portion and a rearward portion, and the threaded portion is between the forward and rearward portions;
- wherein the rearward portion of the body is configured to include a plurality of fingers that extend from a tubular wall of the rearward portion in a rearward direction away from the threaded and forward portions; and
- wherein a forward portion of the cap includes internal threads that are sized and arranged to be threadedly coupled with the threaded portion of the body.

25. The fiber optic connector of claim 23, a sleeve configured to be insertingly and non-rotatingly received by the body;
- wherein the sleeve includes an elongated tubular member terminating at a forward flanged head portion, and the flanged head portion includes a first flange portion rearward of a second flange portion, each of the first and second flange portions including an annular flange, with the second flange portion having a greater outer dimension that the first flange portion, the first flange portion including at least one flattened region on its outer surface; and
- wherein the tubular wall of the rearward portion of the body includes an annular notch configured to receive the first flange portion of the sleeve, and the notch includes one or more flattened regions sized and arranged to receive the one or more flattened regions of the first flange portion of the sleeve such that the sleeve does not rotate relative to the body when the first flange portion is received by the notch.

26. The fiber optic connector of claim 23, wherein a rearward portion of the cap includes an outer surface having a barb configured to receive a boot.

27. The fiber optic connector of claim 23, wherein the body is configured to be coupled with a sub-assembly of a fiber optic connector.

28. The fiber optic connector of claim 27, wherein the sub-assembly is configured to be coupled with a fiber optic connector housing.

29. The fiber optic connector of claim 28, wherein the fiber optic connector housing comprises an SC connector, an LC connector, or an ST connector.

30. A fiber optic connector assembly comprising:
- a fiber optic cable having a circumferential groove;
- the fiber optic connector of claim 23 configured to be coupled with the fiber optic cable;
- wherein an inner surface of the body includes an annularly-extending ridge that protrudes radially inward; and
- wherein the annularly-extending ridge is configured to engage the circumferential groove in the fiber optic cable to prevent relative axial movement between the fiber optic cable and the connector.

* * * * *